(12) United States Patent
Parivash

(10) Patent No.: US 10,730,084 B2
(45) Date of Patent: Aug. 4, 2020

(54) NESTED MULTI-PORT PIPE PREPARATION DEVICE

(71) Applicant: Jamshid Parivash, Los Altos, CA (US)

(72) Inventor: Jamshid Parivash, Los Altos, CA (US)

( * ) Notice: Subject to any disclaimer, the term of this patent is extended or adjusted under 35 U.S.C. 154(b) by 137 days.

(21) Appl. No.: 15/899,869

(22) Filed: Feb. 20, 2018

(65) Prior Publication Data

US 2018/0185892 A1 Jul. 5, 2018

Related U.S. Application Data

(60) Provisional application No. 62/498,254, filed on Dec. 21, 2016.

(51) Int. Cl.
| | | |
|---|---|---|
| *B08B 9/02* | (2006.01) | |
| *B24B 9/00* | (2006.01) | |
| *B08B 9/027* | (2006.01) | |
| *B08B 9/023* | (2006.01) | |

(52) U.S. Cl.
CPC .............. *B08B 9/021* (2013.01); *B08B 9/023* (2013.01); *B08B 9/027* (2013.01); *B24B 9/007* (2013.01)

(58) Field of Classification Search
CPC .. B08B 9/00; B08B 9/02; B08B 9/021; B08B 9/023; B08B 9/027; B24B 9/007
USPC ........ 15/88, 104.02–104.05, 104, 9, 104.095
See application file for complete search history.

(56) References Cited

U.S. PATENT DOCUMENTS

| | | | |
|---|---|---|---|
| 1,710,127 A | 4/1929 | Vaughn | |
| 1,838,958 A | 12/1931 | Page | |
| 2,793,473 A * | 5/1957 | Hickman | ................ B24B 23/08 451/65 |
| 3,000,026 A * | 9/1961 | Prins | ....................... B08B 9/021 15/88.3 |
| 4,014,063 A | 3/1977 | Bunke | |
| 4,862,549 A * | 9/1989 | Criswell | .................. A46B 9/02 15/104.04 |
| 5,791,005 A | 8/1998 | Grabowski et al. | |
| 2008/0250648 A1* | 10/2008 | Parish | ..................... B08B 9/021 30/93 |

(Continued)

FOREIGN PATENT DOCUMENTS

| | | | |
|---|---|---|---|
| CA | 2889558 | * | 10/2016 |
| DE | 3535806 | * | 4/1987 |

(Continued)

*Primary Examiner* — Mark Spisich
(74) *Attorney, Agent, or Firm* — Williams Intellectual Property; Timothy Snyder

(57) ABSTRACT

A nested multi-port pipe preparation device is provided herein. The nested multi-port pipe preparation device is a single tool configured to clean and deburr the ends of two or more differently sized pipes and pipe fittings. The device includes a housing having a plurality of ports. Each port includes a single female pipe-cleaning member, a single male pipe-cleaning member, or a pipe-cleaning member assembly. The pipe-cleaning member assembly includes a male pipe-cleaning member and a female pipe-cleaning member concentrically surrounding the male pipe-cleaning member such that an exterior portion of a pipe and the interior portion of a pipe fitting can be cleaned in the device. The device further includes two or more deburring blades positioned relative to the single female pipe-cleaning member and the pipe-cleaning member assembly for deburring a pipe as the pipe is cleaned.

15 Claims, 8 Drawing Sheets

(56) References Cited

U.S. PATENT DOCUMENTS

2009/0209178 A1* 8/2009 Vargas .................... B08B 9/021
451/51

FOREIGN PATENT DOCUMENTS

| DE | 19751319 | * | 5/1999 |
| EP | 885666 | * | 12/1998 |
| GB | 2147835 | * | 5/1985 |

* cited by examiner

NESTED MULTI-PORT PIPE PREPARATION DEVICE

CROSS-REFERENCE TO RELATED APPLICATIONS

The present application claims priority benefit to U.S. Provisional Application No. 62/498,254 filed on Dec. 21, 2016, the contents of which are incorporated herein by reference.

FEDERALLY SPONSORED RESEARCH OR DEVELOPMENT

Not applicable

INCORPORATION BY REFERENCE OF MATERIAL SUBMITTED ON A COMPACT DISK

Not applicable

BACKGROUND OF THE INVENTION

Metal pipes (e.g., copper pipes) and tubes are used in several different applications such as heating, ventilation, and air conditioning (HVAC) to direct the flow of fluids without leakage. For any given job, the metal pipes need to be properly sized and oriented, which may be accomplished by cutting a pipe to a desired length and fitting an end of the pipe into an end of a secondary metal pipe, tube, or preformed pipe joint. Prior to fitting one pipe end into another, the pipe ends need to be properly cleaned and deburred to ensure a proper seal. The current methods for cleaning and the pipe ends generally include hand-held or power-driven male and female wire brushes, and abrasive cloths such as emery cloth. To deburr the pipe ends, a deburring blade is typically used. However, all of the current wire brush-type cleaning devices have a separate male and female cleaning wire brush for each pipe size and require the use of a separate internal deburring tool in an additional preparation step. Therefore, a complete set of cleaning tools to clean and deburr the three most commonly used metal pipes, tubes, and associated fittings (0.5 inch national pipe thread (NPT) pipe, 0.75 inch NPT pipe, and 1.0 inch NPT pipe) requires six or more separate wire brushes (three different male wire brush sizes and three different female wire brush sizes), and one or more deburring tools. This requires purchasing, keeping track of, and using multiple cleaning tools to address the three most common pipe sizes. An abrasive cloth may be used in lieu of the wire brushes, but the cloths are difficult to work with and less efficient, as the cloths are conventionally formed around or into the pipe end by a user's fingers and manually worked about the pipe end. The abrasive cloths additionally require the use of a separate deburring tool to deburr the pipe ends.

Thus, there is a need in the art for a nested multi-port pipe preparation device capable of cleaning and deburring two or more differently sized pipes and pipe fittings.

FIELD OF THE INVENTION

The present invention generally relates to the field of pipe end cleaning and deburring, and more particularly to a nested multi-port pipe preparation device capable of cleaning and deburring two or more differently sized pipes and pipe fittings.

SUMMARY OF THE INVENTION

The general purpose of the nested multi-port pipe preparation device, described subsequently in greater detail, is to provide a nested multi-port pipe preparation device which has many novel features that result in a nested multi-port pipe preparation device which is not anticipated, rendered obvious, suggested, or even implied by prior art, either alone or in combination thereof.

A nested multi-port pipe preparation device is provided. The device includes a housing having a first port and a second port. The first port has a first pipe-cleaning assembly therein and the second port has a second pipe-cleaning assembly therein. The first cleaning assembly includes a first male pipe-cleaning member having a first outer diameter for cleaning an interior portion of a first pipe fitting, and a first female pipe-cleaning member concentrically surrounding the first male pipe-cleaning member having a first inner diameter for cleaning an exterior portion of a first pipe. The second pipe-cleaning assembly includes a second male pipe-cleaning member having a second outer diameter for cleaning an interior portion of a second pipe fitting, and a second female pipe-cleaning member having a second inner diameter concentrically surrounding the second male pipe-cleaning member for cleaning an exterior portion of a second pipe.

In specific embodiments, the first outer diameter of the first male pipe-cleaning member fits either a 0.75 inch nominal pipe size (NPS) pipe fitting or a 0.75 inch national pipe thread (NPT) pipe fitting, and the first inner diameter of the first female pipe member fits either a 1.0 inch NPS pipe or 1.0 inch NPT pipe. The second outer diameter of the second male pipe-cleaning member fits either a 0.5 inch NPS pipe fitting or a 0.5 inch NPT pipe fitting, and the second inner diameter of the second female pipe-cleaning member fits either a 0.75 inch NPS pipe or a 0.75 NPT inch pipe.

The device further includes a first deburring blade situated between the first male cleaning member and the first female cleaning member to deburr an inside edge of the first pipe, and a second deburring blade situated between the second male cleaning member and the second female cleaning member to deburr an inside edge of the second pipe.

The housing may further include a top half shell and a bottom half shell. The top half shell and the bottom half shell are connected at a connection plane to form the housing. The top half shell and the bottom half both have two or more removed portions at the connection plane that correspondingly mate to form at least an outer region of at least the first port and the second port. Assembled in the housing is a top half core shell assembled to a bottom half core shell. The top half core shell has a first set of hemi-cylindrical channels that mate with a mirrored set of hemi-cylindrical channels in the bottom half core shell to form at least the first port and the second port in which the first pipe-cleaning assembly and second pipe-cleaning assembly reside therein. Assembled in between the top half core shell and the bottom half core shell is a planar triangular body, where the first deburring blade and the second deburring blade are connected to and project from a first side and a second side of the planar triangular body.

In some embodiments, the housing is in the form of a sphere, wherein an outer surface of the housing further includes finger grips to reduce handling stress and increase available torque. The housing may further include a third port having a single male pipe-cleaning member therein. The single male pipe-cleaning member having a third outer diameter for cleaning an interior portion of a third pipe fitting. The third outer diameter of the single male pipe-cleaning member may fit either a 1.0 inch NPS pipe fitting or a 1.0 inch NPT pipe fitting. The housing may further include a fourth port having a single female pipe-cleaning member therein. The single female pipe-cleaning member having a third inner diameter for cleaning an exterior portion of a third pipe. The third inner diameter of the single female pipe-cleaning member may fit either a 0.5 inch NPS pipe or a 0.5 inch NPT pipe.

The first male pipe-cleaning member may be a first male pipe-cleaning wire brush and the first female pipe-cleaning member may be a first female pipe-cleaning wire brush. The second male pipe-cleaning member may be a second male pipe-cleaning wire brush, and the second female pipe-cleaning member may be a second female pipe-cleaning wire brush. In other embodiments, the first male pipe-cleaning member is a first male pipe-cleaning cloth, and the first female pipe-cleaning member is a first female pipe-cleaning cloth. The second male pipe-cleaning member is a second male pipe-cleaning cloth, and the second female pipe-cleaning member is a second female pipe-cleaning cloth.

Thus has been broadly outlined the more important features of the present nested multi-port pipe preparation device so that the detailed description thereof that follows may be better understood and in order that the present contribution to the art may be better appreciated.

Objects of the present nested multi-port pipe preparation device, along with various novel features that characterize the invention are particularly pointed out in the claims forming a part of this disclosure. For better understanding of the nested multi-port pipe preparation device, its operating advantages and specific objects attained by its uses, refer to the accompanying drawings and description.

BRIEF DESCRIPTION OF THE DRAWINGS

In the figures, identical structures, elements or parts that appear in more than one figure are generally labeled with a same numeral in all the figures in which they appear. Dimensions of components and features shown in the figures are generally chosen for convenience and clarity of presentation and are not necessarily shown to scale. The figures are listed below.

FIGURES

Figure 1A:
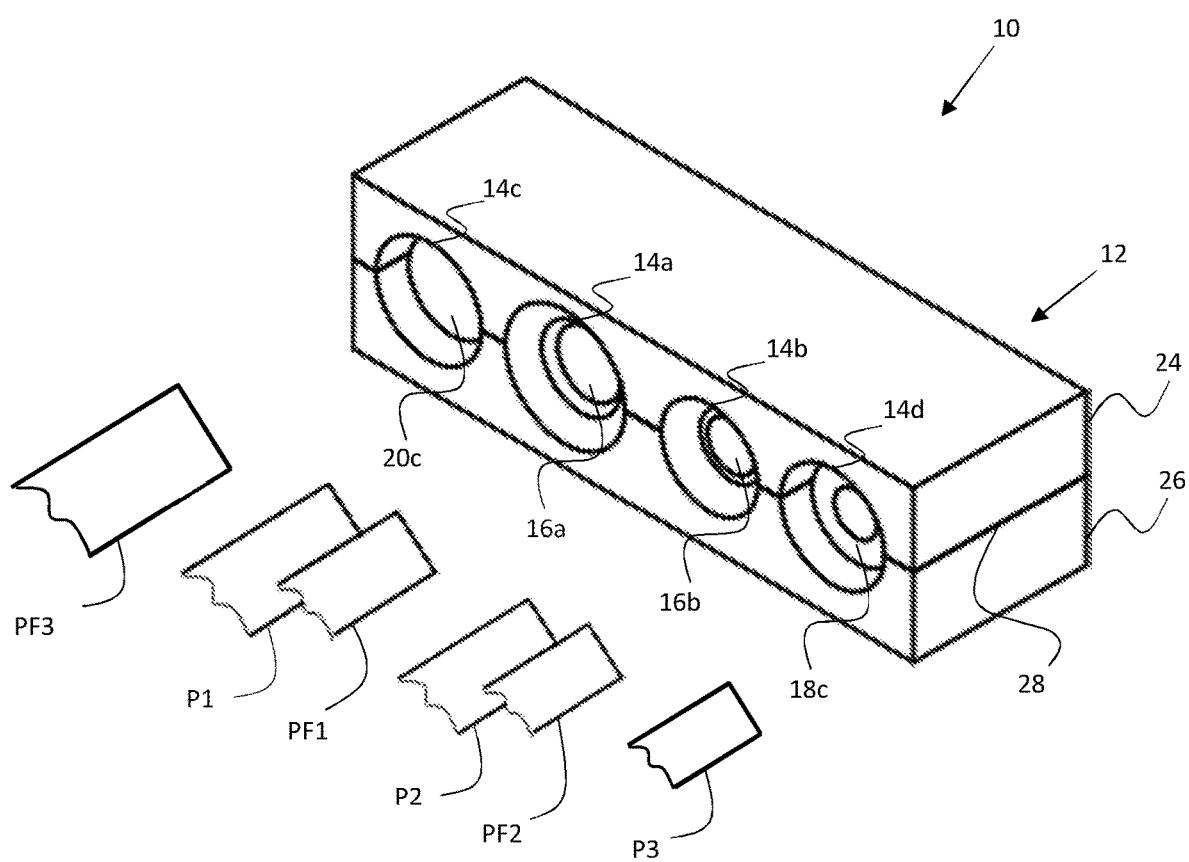

FIG. 1A is an assembled perspective view of a nested multi-port pipe preparation device in accordance with embodiments of the invention.

Figure 1B:
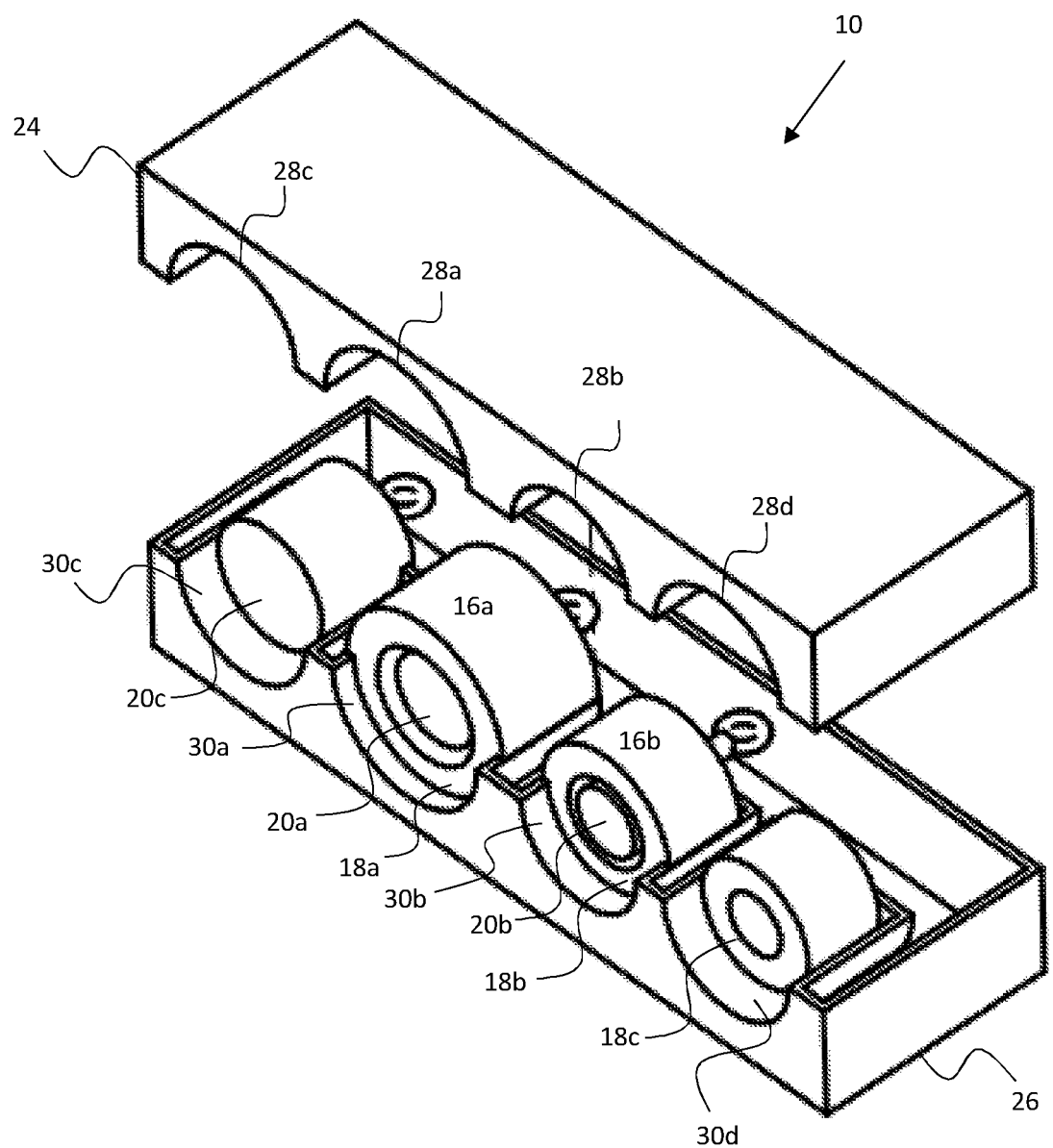

FIG. 1B is an exploded perspective view of a nested multi-port pipe preparation device in accordance with embodiments of the invention.

Figure 2A:
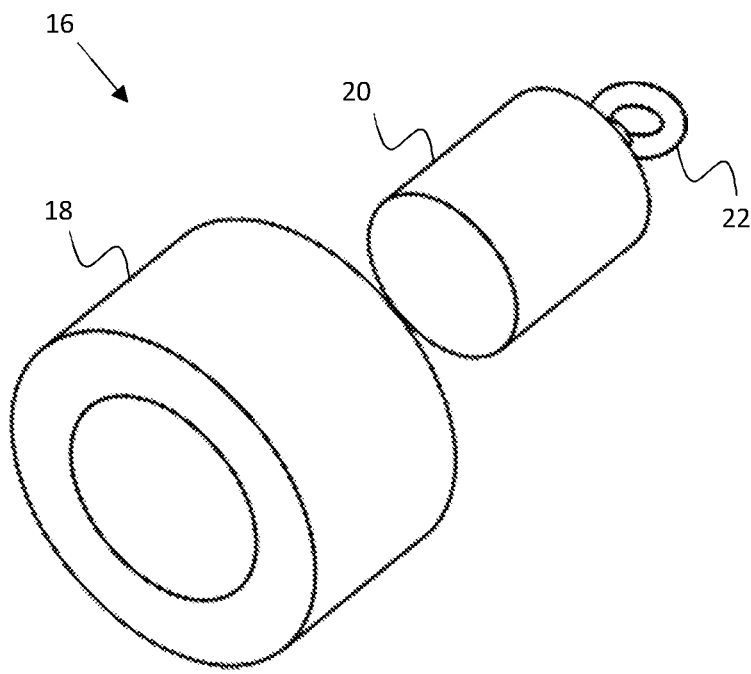
Figure 2B:
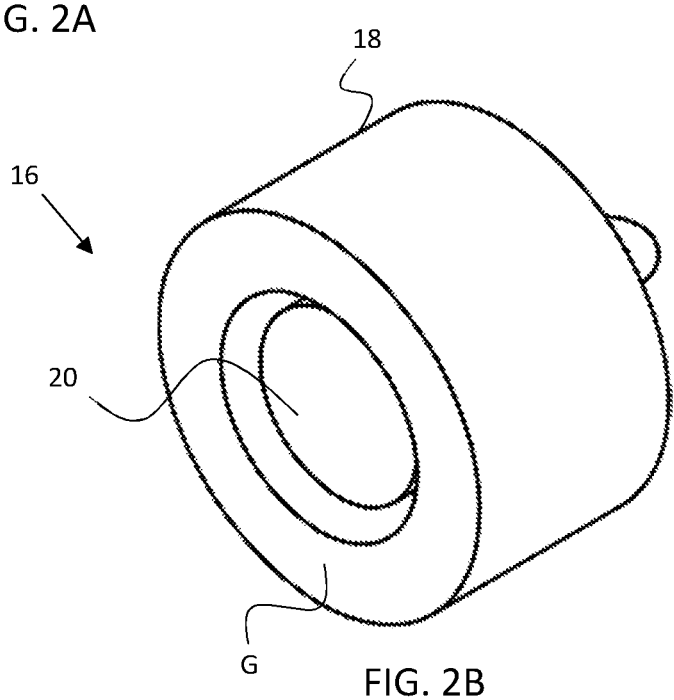

FIGS. 2A and 2B depict a pipe-cleaning assembly in accordance with embodiments of the invention, where FIG. 2A is an exploded view thereof, and FIG. 2B is an assembled view thereof.

Figure 3A:
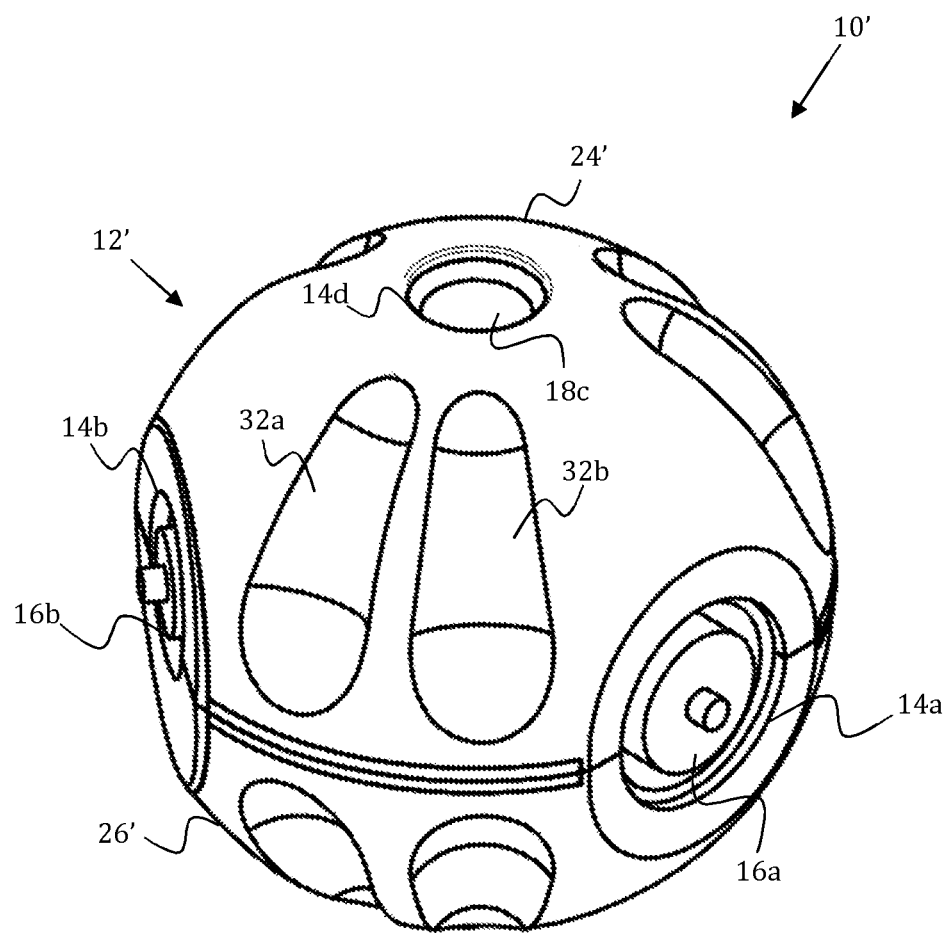

FIG. 3A depicts a perspective view of another configuration of an assembled nested multi-port pipe preparation device in accordance with embodiments of the invention.

Figure 3B:
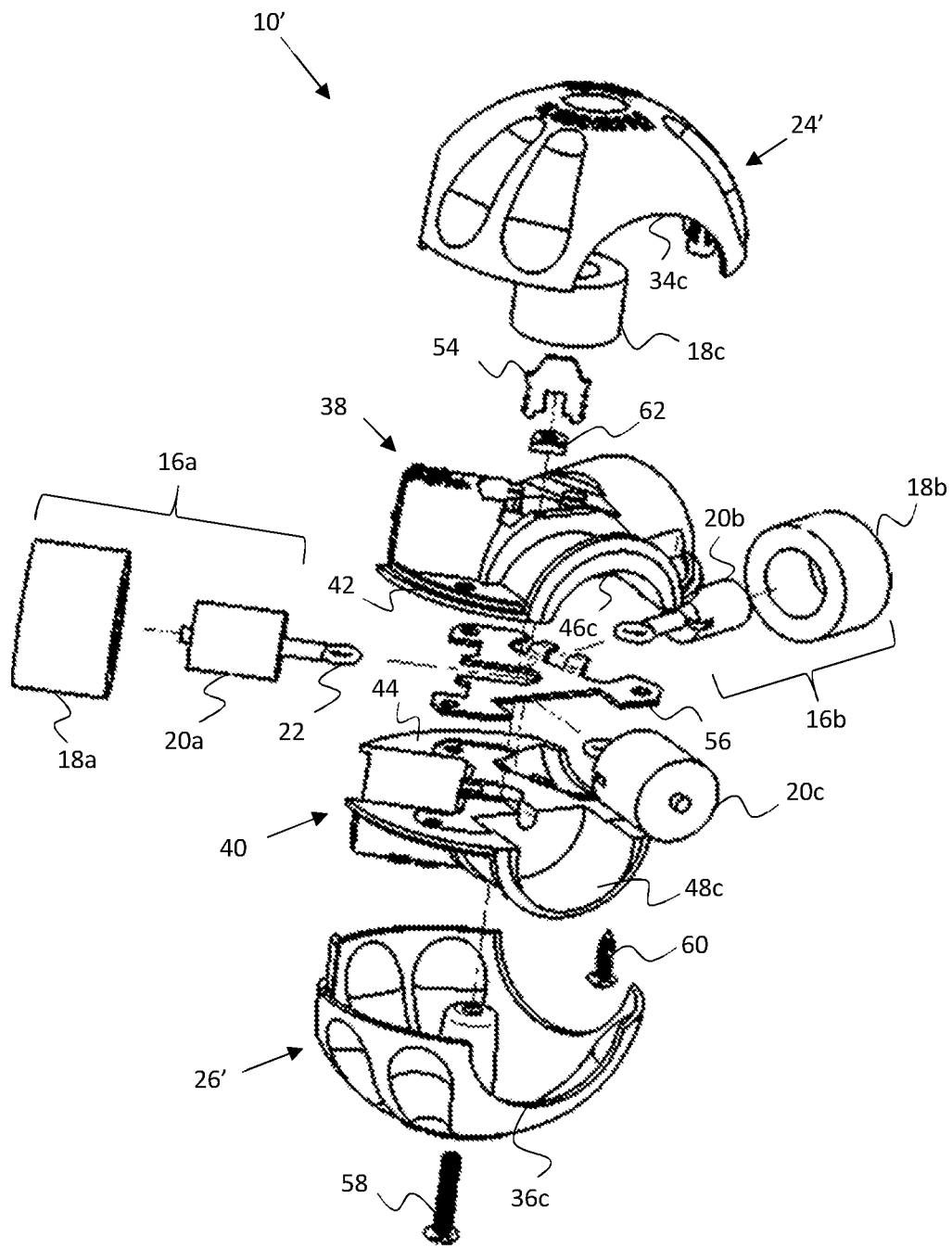
Figure 3C:
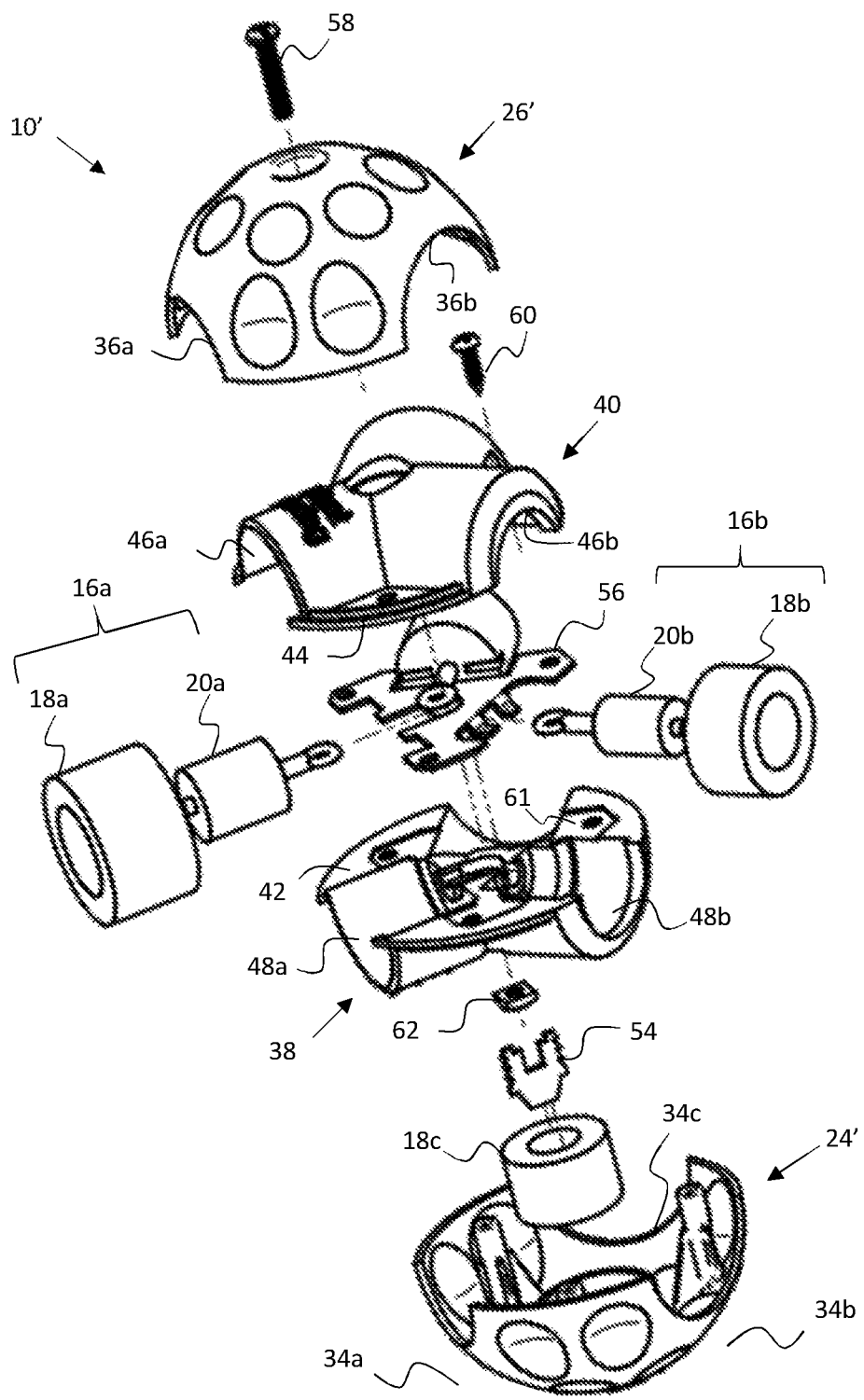
Figure 3D:
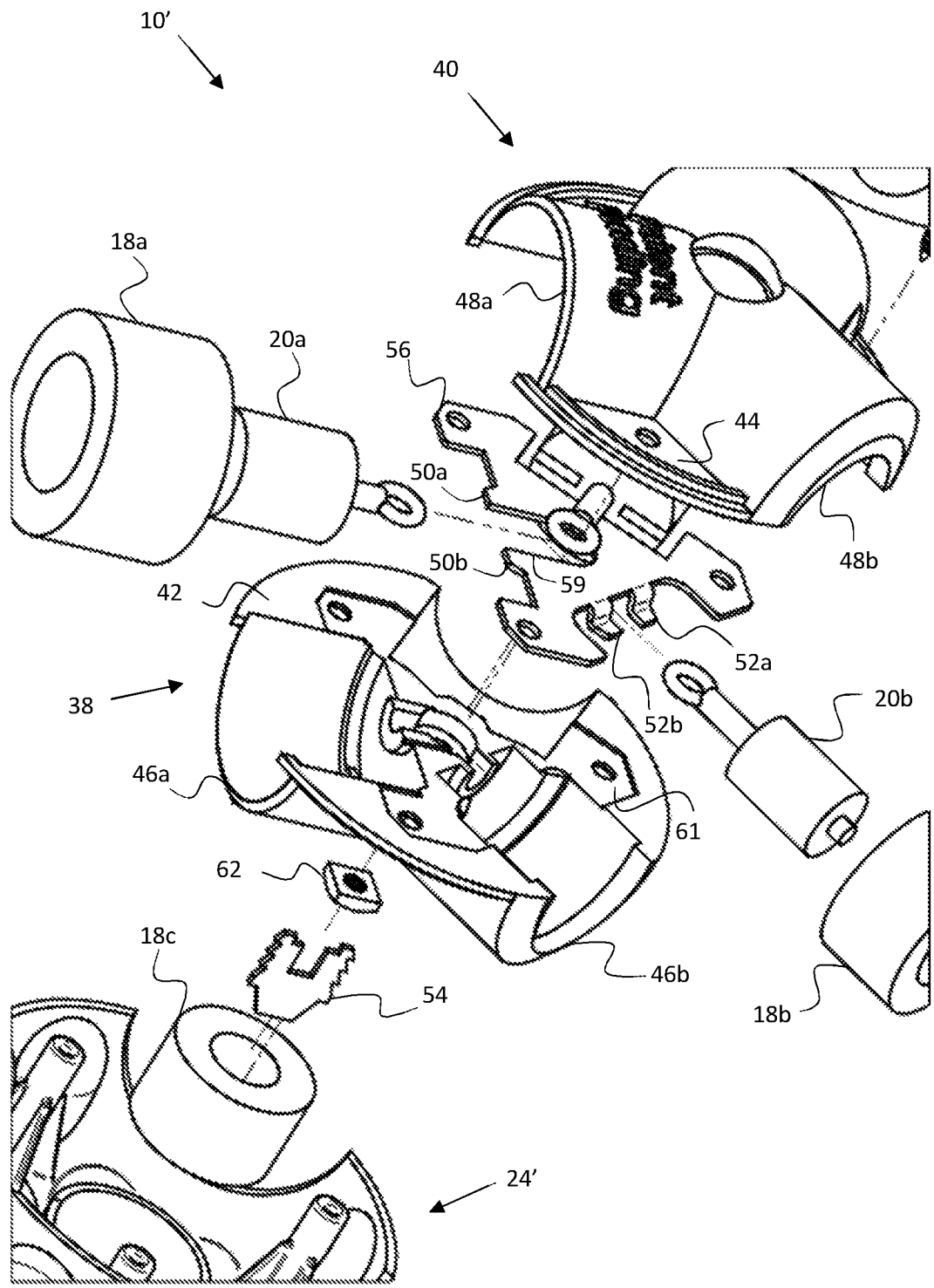

FIGS. 3B to 3D depict exploded views of the multi-port pipe preparation device shown in FIG. 3A in accordance with embodiments of the invention, where FIG. 3B is a top perspective view thereof, FIG. 3C is a bottom perspective view thereof with an alternate finger grip configuration, and FIG. 3D is a detailed bottom perspective view thereof.

Figure 4A:
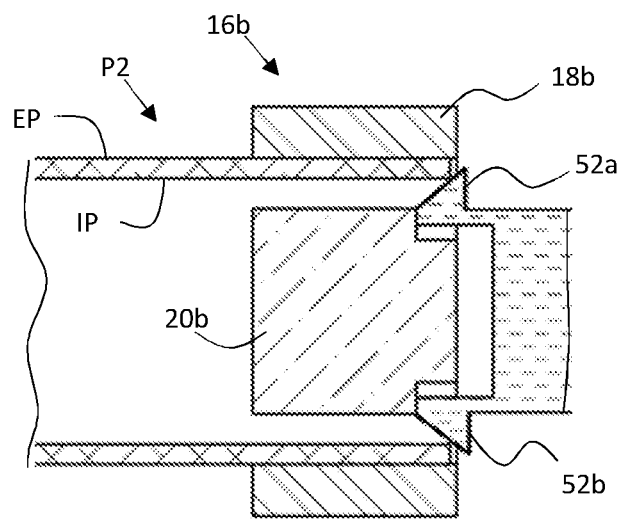
Figure 4B:
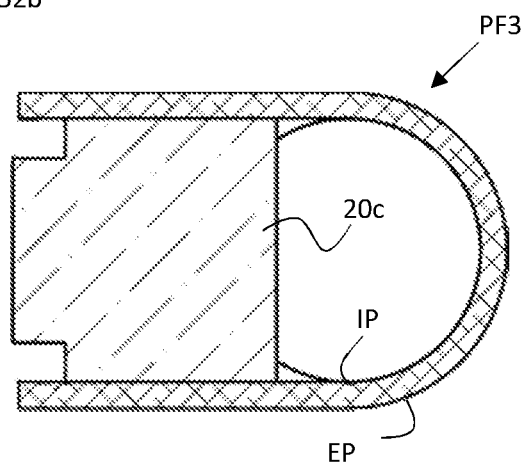
Figure 4C:
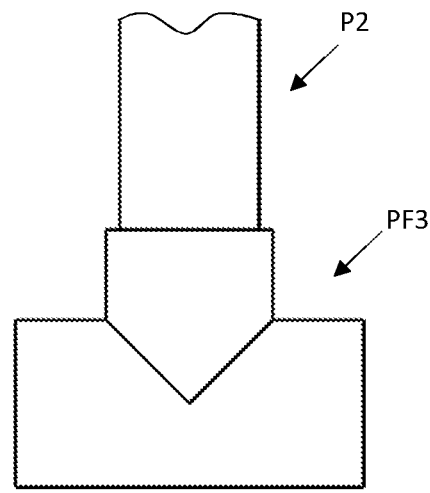

FIGS. 4A to 4C illustrate a method for cleaning and deburring a pipe and pipe fitting in accordance with embodiments of the invention, where FIG. 4A is a longitudinal cross-sectional view of a pipe being cleaned and deburred in a pipe-cleaning member assembly, FIG. 4B is a longitudinal cross-sectional view of a pipe fitting being cleaned and deburred by a single male pipe-cleaning member, and FIG. 4C depicts the pipe and pipe fitting joined together after the cleaning and deburring steps.

DETAILED DESCRIPTION OF THE DRAWINGS

The present invention has utility as a nested multi-port pipe preparation device capable of cleaning and deburring two or more differently sized pipes and pipe fittings. In specific embodiments, the present invention is particularly advantageous for cleaning and deburring the three most commonly used pipes and pipe fittings including a 0.5 inch NPT pipe/pipe fitting, a 0.75 inch NPT pipe/pipe fitting, and 1.0 inch NPT pipe/pipe fitting. The following description of various embodiments of the invention is not intended to limit the invention to those specific embodiments, but rather to enable any person skilled in the art to make and use this invention through exemplary aspects thereof. Further, it should be appreciated that although embodiments of the invention described herein make reference to the cleaning and deburring of pipes and pipe fittings, other pipes and tubing may likewise utilize and benefit from the nested multi-port preparation device.

As used herein, the term 'pipe' refers to a hollow pipe, tube, or joint having an interior portion and an exterior portion. The term 'pipe fitting' refers to a hollow pipe, tube, or joint having an interior portion and an exterior portion in which the exterior portion of a 'pipe' fits within the interior portion of the 'pipe fitting' to therefore join the 'pipe' and 'pipe fitting' together.

With reference now to the drawings, and in particular FIGS. 1 to 4C thereof, examples of the instant nested multi-port pipe preparation device employing the principles and concepts of the present nested multi-port pipe preparation device and generally designated by the reference number 10 will be described.

With reference to FIGS. 1A and 1B, a particular embodiment of a nested multi-port pipe preparation device 10 is shown, where FIG. 1A is an assembled view thereof, and FIG. 1B is an exploded view thereof. The nested multi-port pipe preparation device 10 is a single tool configured to clean and deburr two or more differently sized pipes and pipe fittings. The nested multi-port pipe preparation device 10 generally includes a housing 12 having a plurality of ports (14a, 14b, 14c, 14d), and nested inside each of the plurality of ports (14a, 14b, 14c, 14d) is a pipe-cleaning assembly (16a, 16b), a single female pipe-cleaning member 18c, or a single male pipe-cleaning member 20c. The pipe-cleaning assembly 16 is configured to clean an exterior portion of a pipe P and an interior portion of a pipe fitting PF. More specifically, with reference to FIGS. 2A to 2B, an example of a pipe-cleaning assembly 16 is shown, where FIG. 2A is an assembled view thereof and FIG. 2B is an exploded view thereof. The pipe-cleaning assembly 16 includes a male pipe-cleaning member 20 nested inside a female pipe-cleaning member 18 such that the female pipe-cleaning member 18 concentrically surrounds the male pipe-cleaning member 20 with a small gap G therebetween to permit a pipe P and pipe fitting PF to be inserted therein. However, it should be appreciated that bristles and/or other cleaning materials associated with the male pipe-cleaning member 20 and/or female pipe-cleaning member 18 may extend across the gap G and still permit the insertion of a pipe P and pipe fitting PF therein. The female pipe-cleaning members 18 are configured to clean the exterior portion of a pipe P, and the male pipe-cleaning members 20 are configured to clean the interior portion of a pipe fitting PF. The male pipe-cleaning member 20 may further include an eyelet 22 connected to and extending away from a rear side of the male pipe-cleaning member 20 to facilitate the assembly of the pipe-cleaning assembly 16 in the nested multi-port pipe preparation device 10 as further described below.

With reference back to FIGS. 1A and 1B, in specific embodiments, the nested multi-port pipe preparation device 10 may include a first port 14a having a first pipe-cleaning assembly 16a therein and a second port 14b having a second pipe-cleaning assembly therein 16b. The first pipe-cleaning assembly 16a includes a first male pipe-cleaning member 20a having a first outer diameter for cleaning an interior portion of a first pipe fitting PF1, and a first female pipe-cleaning member 18a concentrically surrounding the first male pipe-cleaning member 20a having a first inner diameter for cleaning an exterior portion of a first pipe P1. The second pipe-cleaning assembly 16b comprises a second male pipe-cleaning member 20b having a second outer diameter for cleaning an interior portion of a second pipe fitting PF2, and a second female pipe-cleaning member 18b having a second inner diameter concentrically surrounding the second male pipe-cleaning member 20b for cleaning an exterior portion of a second pipe P2. The first pipe P1, second pipe P2, first pipe fitting PF1, and second pipe fitting PF2 all being of different size, and therefore the first male pipe-cleaning member 20a, the first female pipe-cleaning members 18a, second male pipe-cleaning member 20b, and second female pipe-cleaning member 18b are sized to clean each of those different pipes (P1, P2) and pipe fittings (PF1, PF2). In specific embodiments, first pipe fitting PF1 is either a 0.75 inch NPT pipe fitting or a 0.75 inch NPS pipe fitting, the second pipe fitting PF2 is either a 0.5 inch NPT pipe fitting or 0.5 inch NPS pipe fitting, the first pipe P1 is either a 1.0 inch NPT pipe or a 1.0 inch NPS pipe, and the second pipe P2 is either a 0.75 inch NPT pipe or a 0.75 inch NPS pipe. However, it should be appreciated that the pipe-cleaning assemblies (16a, 16b) may be sized to accommodate an array of differently sized pipes P with the main criteria being that of having two or more pipe-cleaning assemblies (16a, 16b) in the nested multi-port pipe preparation device 10 capable of cleaning two or more differently sized pipes and pipe fittings.

The nested multi-port pipe preparation device 10 may further include a third port 14c having a single male pipe-cleaning member 20c therein for cleaning the interior portion of a third pipe fitting PF3, and a fourth port 14d having a single female pipe-cleaning member 18c therein for cleaning the exterior portion of a third pipe P3. Each cleaning member/assembly (16a, 16b, 18c, 20c) is sized corresponding to the size of the pipe to be cleaned. In specific embodiments, the third pipe fitting PF3 is greater than or equal to either a 1.0 inch NPT pipe fitting or a 1.0 inch NPS pipe fitting, and the third pipe P3 is less than or equal to either a 0.5 inch NPT pipe or a 0.5 inch NPS pipe.

In particular embodiments, with reference to FIG. 1B, the housing 12 is assembled in two or pieces. The housing 12 includes a top half shell 24 and a bottom half shell 26. The top half shell 24 and the bottom half shell 26 are connected at a connection plane 28 to form the housing 12. The top half shell 24 and the bottom half 26 both have two or more removed portions at the connection plane 28 that correspondingly mate to form at least an outer region of at least the first port 14a and the second port 14b. In some embodiments, the two or more removed portions on the top half shell 24 are two or more hemi-cylindrical channels (28a, 28b, 28c, 28d) and the two or more removed portions on the bottom half shell 26 are two or more mirrored hemi-cylindrical channels (30a, 30b, 30c, 30d) (i.e., mirrored relative to the top half shell hemi-cylindrical channels (28a, 28b, 28c)), where the two or more hemi-cylindrical channels (28a, 28b, 28c, 28d) in the top half shell 24 correspondingly mate with the two or more hemi-cylindrical channels (30a, 30b, 30c, 30d) in the bottom half shell 26 to form the plurality of ports (14a, 14b, 14c, 14d). The two or more hemi-cylindrical channels (28a, 28b, 28c, 28d) in the top half shell 24 and the two or more hemi-cylindrical channels (30a, 30b, 30c, 30d) in the bottom half shell 26 are each correspondingly sized (e.g., the radius of the hemi-cylinders are chosen) to accommodate the size of each pipe-cleaning member/assembly (16a, 16b, 18c, 20c). For example, the hemi-cylindrical channels 28c and 30c that form the third port 14c is larger than hemi-cylindrical channels 28d and 30d that forms the fourth port 14d. In particular embodiments, the top half shell 24 and bottom half shell 26 have a molded interior that further holds/supports the pipe-cleaning members/assemblies (16a, 16b, 18c, 20c) within the housing 12 for assembly and to reduce the relative rotation of the pipe-cleaning members/assemblies (16a, 16b, 18c, 20c) and a pipe P or pipe fitting PF, when a pipe P or pipe fitting PF is rotated within the device 10. In a specific embodiment, to reduce the relative rotation, the outer surfaces of a single female pipe-cleaning member 18c, a single male pipe-cleaning member 20c, or the female pipe-cleaning members (18a, 18b) of the pipe-cleaning assemblies (16a, 16b) are fittingly seated against the walls of their corresponding ports (14a, 14b, 14c, 14d). Eyelets 22 connected to and extending from a rear side of the male pipe-cleaning members (20a, 20b, 20c) may be used to fasten (e.g., with fastening elements including screws, nails, rivets, adhesives) the male pipe-cleaning members (20a, 20b, 20c) to the interior of the housing 12. The fastening ensures the male pipe-cleaning members (20a, 20b, 20c) do not rotate relative to a pipe P as the pipe P is being cleaned as well as ensuring the gap G between a female cleaning member (18a, 18b) and the male cleaning member (20a, 20b) of the pipe-cleaning assemblies (16a, 16b) is maintained.

The housing 12 may take on many different shapes and/or configurations such as the rectangular bar form as illustrated in FIGS. 1A to 1B, or other geometrical forms such as the spherical from as illustrated and described below with reference to FIGS. 3A to 3D. The housing 12 may not necessarily include two or more pieces that are assembled together. It is contemplated that the housing 12 may be a monolithic structure, where holes may be bored into the monolithic structure to create the ports (14a, 14b, 14c, 14d) therein, where a single male pipe-cleaning member 20c, a single female pipe-cleaning member 18c, and/or a pipe-cleaning assembly (16a, 16b) may be directly fastened into the backside of the ports (14a, 14b, 14c, 14d).

The materials used to construct the components described may be metallic and/or polymeric depending on the intended use of the components. For example, the housing 12 may be constructed of a polymeric material, while portions of the female pipe-cleaning members (18a, 18b, 18c, 18d) and the male pipe-cleaning members (20a, 20b, 20c, 20d) may be constructed of metallic materials, polymeric materials, textiles (e.g., abrasive cloths), or a combination thereof. In specific embodiments, the female pipe-cleaning members (18a, 18b, 18c, 18d) are female pipe-cleaning wire brushes, and the male pipe-cleaning members (20a, 20b, 20c, 20d) are male pipe-cleaning wire brushes known in the art. In other embodiments, the bulk of the female pipe-cleaning members (18a, 18b, 18c, 18d) are made of a rigid metallic or polymeric material with an abrasive cloth lining the interior portion (i.e., the inner diameter) of the female pipe-cleaning members (18a, 18b, 18c, 18d), while the male pipe-cleaning members (20a, 20b, 20c, 20d) have a rigid core made of a metallic or polymeric material with an abrasive cloth lining the exterior portion (i.e., the outer diameter) of the male pipe-cleaning members (20a, 20b, 20c, 20d). It should be appreciated, that the female pipe-cleaning members (18a, 18b, 18c, 18d) and male pipe-cleaning members (20a, 20b, 20c, 20d) may be a combination of abrasive cloth type cleaning members and wire brush type cleaning members without departing form the scope of the invention. It should further be appreciated that the housing 12 may have several additional ports for nesting several other single male pipe-cleaning members 20, single female pipe-cleaning members 18, and pipe-cleaning assemblies 16 as needed.

With reference to FIGS. 3A to 3D, a particular embodiment of a nested multi-port pipe preparation device 10' is shown, where FIG. 3A is an assembled view thereof, FIG. 3B is a top perspective exploded view thereof, FIG. 3C is a bottom perspective exploded view thereof, and FIG. 3D is detailed perspective exploded view thereof. The nested multi-port pipe preparation device 10' also includes a housing 12', and two or more ports (14a, 14b, 14c, 14d) each having nested therein either a single female pipe-cleaning member 18c, a single male pipe-cleaning member 20c, or a pipe-cleaning assembly (16a, 16b). Like before, the first pipe-cleaning assembly 16a has a first male pipe-cleaning member 20a for cleaning the interior portion of a first pipe fitting PF1, and a female pipe-cleaning member 18a concentrically surrounding the first male cleaning member 20a for cleaning the exterior portion of a first pipe P1. A second pipe-cleaning assembly 16b has a second male pipe-cleaning member 20b for cleaning the interior portion of a second pipe fitting PF2, and a second female pipe-cleaning member concentrically surrounding the second male pipe-cleaning member 20b for cleaning the exterior portion of the second pipe P2. The first pipe-cleaning assembly 16a is sized to clean the first pipe fitting PF1 and first pipe P1, and the second pipe-cleaning assembly 16b is sized to clean the second pipe fitting PF2 and second pipe P2 as described above.

The nested multi-port pipe preparation device 10' illustrated in FIGS. 3A to 3D has a housing 12' in the geometrical form of a sphere to improve handling. The outer surface of the housing 12', which is the outer surface of the nested multi-port pipe preparation device 10', further includes a plurality of finger grips (32a, 32b, 32c, 32d) positioned about the outer surface to improve handling and the available torque in which a user can rotate the nested multi-port pipe preparation device 10' about a pipe P or pipe fitting PF. In one embodiment, the finger grips (32a, 32b, 32c, 32d) may be in the form of elongated indentations in the outer surface in which the user's fingers can grip therein as shown in FIGS. 3A and 3B. In another embodiment, the finger grips (32a, 32b, 32c, 32d) are in the form of dimples to permit the user's finger tips to grip the nested multi-port pipe preparation device 10' as shown in FIG. 3C. In a further embodiment, the finger grips (32a, 32b, 32c, 32d) are in the form of elongated protrusions from the outer surface that the user's fingers can grip against. It should be appreciated that any combination of elongated indentations, dimples, or elongated protrusions may be incorporated on the outer surface of the nested multi-port pipe preparation device 10'. Further, the outer surface of the housing 12' and/or finger grips (32a, 32b, 32c, 32d) may include a polymeric and/or slip-resistance material (e.g., rubber) or coating to improve the user's grip.

The housing 12' may include a top half shell 24' and a bottom half shell 26', where the top half shell 24' and said bottom half shell 26' are connected at a connection plane 28 to form the housing 12'. The top half shell 24' and bottom half shell 26' being in the form of hemi-spheres, that when connected form the shape of a sphere. The top half shell 24' and the bottom half 26' both having two or more removed portions at the connection plane 28 that correspondingly mate to form an outer region of at least the first port 14a and the second port 14b. In specific embodiments, the two or more removed portions of the top half shell 24' are hemi-circular cutouts (34a, 34b, 34c), and the two or more removed portions of the bottom half shell 26' are mirrored hemi-circular cutouts (36a, 36b, 36c) (i.e., mirrored relative to the top half shell hemi-circular cuts (34a, 34b, 34c)) such that when the top half shell 24' and bottom half shell 26' are connected, the hemi-circular cutouts (34a, 34b, 34c, 36a, 36b, 36c) form the outer regions of two or more of the plurality of ports (16a, 16b, 16c) at the connection plane 28.

In specific embodiments, the top half shell 24' and bottom half shell 26' include three corresponding hemi-circular cutouts (34a, 34b, 34c, 36a, 36b, 36c) to form outer regions of the first port 14a, second port 14b, and a third port 14c at the connection plane 28. The apex of the top half shell 24' or bottom half shell 26' may further include a full circular cutout that makes up the outer region of a fourth port 14d. As used herein, the 'outer region of a port' refers to the most outer portion of a port exposed to the environment, and/or the first portion of a port (14a, 14b, 14c, 14d) that a pipe P or pipe fitting PF encounters when being inserted into a port (14a, 14b, 14c, 14d). In particular embodiments, the remainder of the of the first port 14a, second port 14b, and third port 14c are made up of a top half core shell 38 and a bottom half core shell 40. The top half core shell 38 and the bottom half core shell 40 include mirrored attachment surfaces (42, 44) to facilitate the assembly of the bottom half core shell 40 to the top half core shell 38 to form a full core shell situated inside the housing 12'. The top half core shell 38 includes a first set of hemi-cylindrical channels (46a, 46b, 46c), and the bottom half core shell 40 includes a mirrored set of hemi-cylindrical channels (49a, 48b, 48c) (i.e., mirrored relative to the top half core shell hemi-cylindrical channels (46a, 46b, 46c)) such that when the top half core shell 24' and bottom half core shell 26' are connected, the hemi-cylindrical channels (46a, 46b, 46c, 48a, 48b, 48c) form the interior (i.e., the internal portion of the port extending away from the outer region of the port and towards the center of the device 10') of the two or more of the plurality of ports (14a, 14b, 14c). In specific embodiments, the top half core shell 38 includes three hemi-cylindrical channels (46a, 46b, 46c) and the bottom half core shell 40 includes three mirrored hemi-cylindrical channels (48a, 48b, 48c) to form the interior of the first port 14a, the second port 14b, and a third port 14c, where a first pipe-cleaning assembly 16a resides in the first port 14a, a second pipe-cleaning assembly 16b resides in the second port 14b, and a single male pipe-cleaning member 20c resides in the third port 14c.

In a specific embodiment, the openings of the first port 14a, the second port 14b, and the third ports 16c lie on the connection plane 28, where a normal vector with respect to the openings of the first, second, and third port (14a, 14b, 14c) is directed in different directions on the connection plane 28. For example, a normal vector with respect to the opening of the first port 14a is directed at 0 degrees on the connection plane 28, a normal vector with respect to the opening of the second port 14b is directed at 120 degrees on the connection plane 28, and a normal vector with respect to the opening of the third port 14 is directed at 240 degrees on the connection plane 28. In other embodiments, a normal vector with respect to the openings of each of the ports (14a, 14b, 14c) are all in the same direction on the connection plane 28, but the ports (14a, 14b, 14c) are offset as illustrated in FIGS. 1A to 1B.

In a particular embodiment, the device 10' may further include a single female cleaning member 18c positioned between the top half core shell 38 and the top half shell 24' where the single female cleaning member 18c is accessible through the fourth port 14d created by the circular cutout at the apex of the top half shell 24' as described above. The single female cleaning member 18c is therefore above and perpendicular to the first port 14a, second port 14b, and third port 14c inside the housing 12'.

The device (10, 10') further includes one or more deburring blades (50a, 50b, 52a, 52b, 54) situated in proximity to at least one of a member 20c, a single female pipe-cleaning member 18c, and a pipe-cleaning member assembly (16a, 16b) and configured to deburr an inside edge of a pipe P as the pipe P is cleaned. In a specific embodiment, as best shown in FIG. 3D, when the device 10' is assembled, a first pair of deburring blades (50a, 50b) are situated between the first male cleaning member 20a and the first female cleaning member 18a at a rear end of the first pipe-cleaning assembly 16a, and a second pair of deburring blades (52a, 52b) are situated between the second male cleaning member 20b and the second female cleaning member 18b at a rear end of the second pipe-cleaning assembly 16b. The rear end of the first male pipe cleaning member 20a and second male pipe cleaning member 20b may further include two opposing notches therein to receive a portion of the deburring blades (50a, 50b, 52a, 52b), where the other portion of the deburring blades (50a, 50b, 52a, 52b) project outwards into the gap G between the male cleaning members (20a, 20b) and the female cleaning members (18a, 18b). A third deburring blade 54 may be situated near the single female pipe-cleaning member 18c that is situated between the top half core shell 38 and the top half shell 24' and is therefore positioned perpendicular with respect to the first pair of deburring blades (50a, 50b) and second pair of deburring blades (52a, 52b). The first, second, and third deburring blades (50a, 50b, 52a, 52b, 54) may be of the same or different sizes, to deburr differently sized pipes depending on the size range of the pipes. Larger pipes may require a larger deburring blade than smaller pipes. Therefore, the size of the deburring blade may be chosen to accommodate any size pipe without departing from the scope of the invention. In a specific embodiment, the first deburring blade is sized to deburr either a 1.0 inch NPT pipe or a 1.0 inch NPS pipe. The second deburring blade is sized to deburr either a 0.75 inch NPT pipe or a 0.75 inch NPS pipe. The third deburring blade is sized to debur at least one of a 0.5 inch NPT pipe or 0.5 inch NPS pipe.

In a specific embodiment, the device 10' further includes a planar triangular body 56 situated between the top half core shell 38 and the bottom half core shell 40. The planar triangular body 56 having the first pair of deburring blades (50a, 50b) and the second pair of deburring blades (52a, 52b) connected to and projecting from a first side and a second side of the planar triangular body 56. The first pair of deburring blades (50a, 50b) may project in-plane with the planar triangular body 56, while the second pair of deburring blades (52a, 52b) first project downwardly then outwardly, in the form of an 'L', from the second side of the planar triangular body 56. This is purposefully designed to compactly assemble the nested multi-port pipe preparation device 10'. As shown in FIGS. 3B to 3D, an eyelet 22 connected to an extending from each of the male pipe-cleaning members (20a, 20b, 20c) is used to fasten the single male pipe-cleaning member 18c, the first pipe-cleaning assembly 16a, and the second pipe-cleaning assembly 16b in the housing 12'. To compact these components, the eyelet of the single male pipe-cleaning member 20c lies above and flush against the planar triangular body 56, the eyelet of the first pipe-cleaning assembly 16a lies within a notch 59 in the planar triangular body 56, and the eyelet of the second pipe-cleaning assembly 16b lies below and flush against the planar triangular body 56 such that the eyelets all align to receive a main fastening element 58 (e.g., a screw) therethrough. A portion of the attachment surfaces (42, 44) of the top half core shell 38 and bottom half core shell 40 may further include an inset 61 that fittingly receives the planar triangular body 56 therein to further compact and stabilize the components of the device 10' in the housing 12'. The device 10' may further include three or more screws 60 to assemble the top half core shell 38 to bottom half core shell 40, and a square nut 62 to receive and tighten the main fastening element 58 that connects all the components of the device 10' together (i.e., the top core shell 24', the bottom core shell 26', the top half core shell 38, the bottom half core shell 40, the planar triangular body 56, the third deburring blade 54, the first pipe-cleaning assembly 16a, the second pipe-cleaning assembly 16b, the single male pipe-cleaning member 20c, and the single female pipe-cleaning member 18c).

Operation

With reference to FIGS. 4A to 4C, a method is illustrated for cleaning an exterior portion EP of the second pipe P2 and the interior portion of the third pipe fitting PF3 with the device (10, 10') as describe above is as follows, where FIG. 4A depicts a longitudinal cross-sectional view of the second pipe P2 being cleaned and deburred, FIG. 4B depicts a longitudinal cross-sectional view of the third pipe fitting PF3 being cleaned, and FIG. 4C depicts the second pipe P2 being joined with the third pipe fitting PF3. First, with respect to FIG. 4a, the end of the second pipe P2 (e.g., a 0.75 inch NPT pipe) is inserted into the second port 14b. The second female pipe-cleaning member 20b contacts the exterior portion EP of the second pipe P2 and the deburring blades (52a, 52b) contacts the inside edge of the second pipe P2. The exterior portion EP of the second pipe P2 and the inside edge are simultaneously cleaned and deburred, respectively, by rotating either the device (10, 10') or the second pipe P2, while the second pipe P2 is inserted in the second port 14b. With respect to FIG. 4B, to clean the third pipe fitting PF3 (e.g., a 1.0 inch NPT pipe fitting 'T' joint), an end of the third pipe fitting PF3 is inserted in the third port 14c, where the single male cleaning member 20c contacts an interior portion IP of the third pipe fitting PF3. The interior portion IP of the third pipe fitting PF3 is cleaned by rotating either the device (10, 10') or the third pipe fitting PF3, while the third pipe fitting PF3 is inserted in the third port 14c.

Once the ends of the second pipe P2 and the third pipe fitting PF3 are cleaned and deburred, the ends may be joined and subsequently soldered to create a proper seal between the second pipe P2 and the third pipe fitting PF3 as shown in FIG. 4C.

OTHER EMBODIMENTS

While at least one exemplary embodiment has been presented in the foregoing detail description, it should be appreciated that a vast number of variations exist. It should also be appreciated that the exemplary embodiment or exemplary embodiments are only examples, and are not intended to limit the scope, applicability, or configuration of the described embodiments in any way. It should be understood that various changes may be made in the function and arrangement of elements without departing from the scope as set forth in the appended claims and the legal equivalents thereof.

What is claimed is:

1. A nested multi-port pipe preparation device comprising:
a housing having a first port and a second port, said first port having a first pipe-cleaning assembly therein and said second port having a second pipe-cleaning assembly therein, wherein said first cleaning assembly comprises a first male pipe-cleaning member having a first outer diameter for cleaning an interior portion of a first pipe fitting, and a first female pipe-cleaning member concentrically surrounding the first male pipe-cleaning member having a first inner diameter for cleaning an exterior portion of a first pipe; and wherein said second pipe-cleaning assembly comprises a second male pipe-cleaning member having a second outer diameter for cleaning an interior portion of a second pipe fitting, and a second female pipe-cleaning member having a second inner diameter concentrically surrounding the second male pipe-cleaning member for cleaning an exterior portion of a second pipe; and
wherein the housing comprises a top half shell and a bottom half shell, said top half shell and said bottom half shell connected at a connection plane to form the housing, wherein the top half shell and the bottom half both have two or more removed portions at the connection plane that correspondingly mate to form at least an outer region of at least the first port and the second port.

2. The device of claim 1 further comprising a first deburring blade situated between the first male cleaning member and the first female cleaning member to deburr an inside edge of the first pipe as the first pipe is cleaned, and a second deburring blade situated between the second male cleaning member and the second female cleaning member to deburr an inside edge of the second pipe as the second pipe is cleaned.

3. The device of claim 2 further comprising a top half core shell assembled to a bottom half core shell within the housing, said top half core shell having a first set of hemi-cylindrical channels that mate with a mirrored set of hemi-cylindrical channels in the bottom half core shell to form at least the first port and the second port in which the first pipe-cleaning assembly and second pipe-cleaning assembly reside therein.

4. The device of claim 3 further comprising a planar triangular body situated between the top half core shell and the bottom half core shell, said planar triangular body having the first deburring blade and second deburring blade connected to and projecting from a first side and a second side of the planar triangular body, respectively.

5. The device of claim 4 wherein the housing is in the form of a sphere, wherein an outer surface of the housing further includes finger grips to reduce handling stress and increase available torque.

6. The device of claim 2 wherein the housing comprises a third port having a single male pipe-cleaning member therein, said single male pipe-cleaning member having a third outer diameter for cleaning an interior portion of a third pipe fitting.

7. The device of claim 6 wherein the third outer diameter of the single male pipe-cleaning member is sized to fit either a 1.0 inch NPS pipe fitting or a 1.0 inch NPT pipe fitting.

8. The device of claim 6 wherein the housing comprises a fourth port having a single female pipe-cleaning member therein, said single female pipe-cleaning member having a third inner diameter for cleaning an exterior portion of a third pipe.

9. The device of claim 8 wherein the third inner diameter of the single female pipe-cleaning member is sized to fit either a 0.5 inch NPS pipe or a 0.5 inch NPT pipe.

10. The device of claim 8 further comprising a third deburring blade situated near an end of the single female pipe-cleaning member for deburring an inside edge of a third pipe as the third pipe is cleaned.

11. The device of claim 10 wherein the third deburring blade is sized to deburr either a 0.5 inch NPS pipe or a 0.5 inch NPT pipe.

12. The device of claim 2 wherein the first deburring blade is sized to deburr either a 1.0 inch NPS pipe or a 1.0 inch NPT pipe; and the second deburring blade is sized to deburr a 0.75 inch NPS pipe or a 0.75 inch NPT pipe.

13. The device of claim 1 wherein the first outer diameter of the first male pipe-cleaning member is sized to fit either a 0.75 inch nominal pipe size (NPS) pipe fitting or a 0.75 inch national pipe thread (NPT) pipe fitting, the first inner diameter of the first female pipe member is sized to fit either a 1.0 inch NPS pipe or a 1.0 inch NPT pipe, the second outer diameter of the second male pipe-cleaning member is sized to fit either a 0.5 inch NPS pipe fitting or a 0.5 inch NPT pipe fitting, and the second inner diameter of the second female pipe-cleaning member is sized to fit either a 0.75 inch NPS pipe or a 0.75 inch NPT pipe.

14. The device of claim 1 wherein the first male pipe-cleaning member is a first male pipe-cleaning wire brush, the first female pipe-cleaning member is a first female pipe-cleaning wire brush, the second male pipe-cleaning member is a second male pipe-cleaning wire brush, and the second female pipe-cleaning member is a second female pipe-cleaning wire brush.

15. The device of claim 1 wherein the first male pipe-cleaning member is a first male pipe-cleaning cloth, the first female pipe-cleaning member is a first female pipe-cleaning cloth, the second male pipe-cleaning member is a second male pipe-cleaning cloth, and the second female pipe-cleaning member is a second female pipe-cleaning cloth.

* * * * *